United States Patent [19]
Tsunoda et al.

[11] 3,937,554
[45] Feb. 10, 1976

[54] HOLOGRAMS IMPREGNATED WITH LASER ACTIVE MATERIAL

[75] Inventors: Yoshito Tsunoda, Tokyo; Yasutsugu Takeda, Kokubunji, both of Japan

[73] Assignee: Hitachi, Ltd., Japan

[22] Filed: Sept. 26, 1973

[21] Appl. No.: 400,725

[30] Foreign Application Priority Data
Sept. 29, 1972  Japan.................................. 47-97057

[52] U.S. Cl.............................. 350/3.5; 331/94.5 C
[51] Int. Cl.² ........................................... G03H 1/22
[58] Field of Search................. 350/3.5; 331/94.5 C; 307/88.3; 330/4.3

[56] References Cited
UNITED STATES PATENTS

| | | | |
|---|---|---|---|
| 3,547,509 | 12/1970 | Brandes................................ | 350/3.5 |
| 3,610,732 | 10/1971 | Mack et al............................ | 350/3.5 |
| 3,632,182 | 1/1972 | Sincerbox............................. | 350/3.5 |
| 3,760,292 | 9/1973 | Kogelnik et al...................... | 350/3.5 |
| 3,761,154 | 9/1973 | Shupe et al.......................... | 350/3.5 |

Primary Examiner—Ronald J. Stern
Attorney, Agent, or Firm—Craig & Antonelli

[57] ABSTRACT

A hologram device carrying at least one hologram on a light sensitive medium in which the part of the light sensitive medium which carries the hologram thereon is impregnated with a laser active material.

21 Claims, 6 Drawing Figures

HOLOGRAMS IMPREGNATED WITH LASER ACTIVE MATERIAL

FIELD OF THE INVENTION

The present invention relates to a hologram device, and more particularly, to a hologram recording medium.

DESCRIPTION OF THE PRIOR ART

Figure 1:
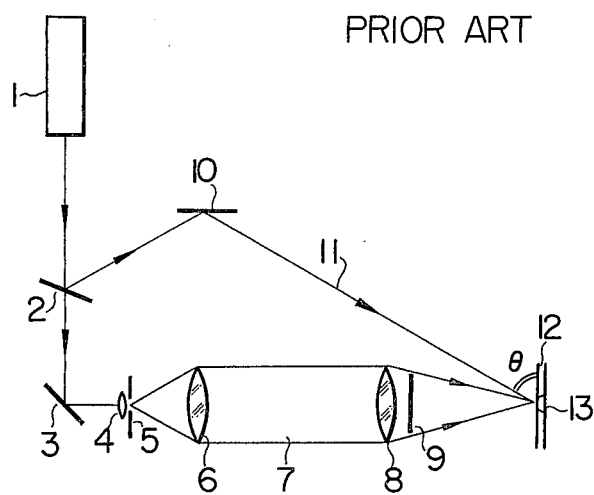
FIG. 1 is a schematic diagram of a prior art holographic recording system of the Fourier transform type.

In a prior art holographic system of the Fourier transform type, the write-in or recording system is as shown in FIG. 1. A laser beam emitted by a laser source 1 is divided by a beam splitter 2 into two beams, one of which is reflected by a reflector 3 and passes through a diverging lens 4, a pinhold 5, and a collimator lens 6 to become a collimated beam 7. The collimated beam 7 passes through a converging or write-in lens 8 and information source 9 to be converged or focused on a light sensitive medium 12 as the information-carrying object beam. The other of the two beams is reflected by a reflector 10 to be directed to the light sensitive medium 12 as a reference beam 11 so that it interferes with the information-carrying object beam to form a hologram 13.

Figure 2:
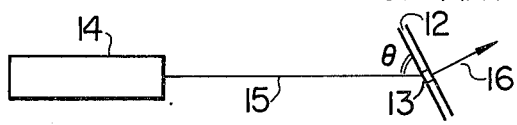
FIG. 2 is a schematic diagram of a reconstructing system for the system of FIG. 1.

In order to reconstruct the information from the thus made hologram 13, a laser beam 15 from a laser source 14 is directed to the hologram 13 on the light sensitive medium 12 at the same angle $\theta$ as that at which the reference beam 11 was directed to the light sensitive medium 12 when the hologram 13 was made as shown in FIG. 2. Then, a reconstructed beam is read out.

As can be understood from the above-described recording and reconstructing systems, relatively large scale optical systems are necessary. A large scale optical system is unavoidable for the recording system for the reason that an accurate adjustment and stability of the optical system is necessary for causing the information-carrying object beam and the reference beam to perfectly interfere with each other to form interference fringes on the light sensitive medium. As to the reconstructing system, there are two points to be considered. One of the two points is that as the reconstructing light source a high chromaticity coherent light source must be used, and the other is that the reconstructing beam must impinge upon the hologram at a predetermined angle. In the past, in order to meet these requirements the reconstructing optical system was arranged on an optical bench, and, as the light source, a large scale one such as an He-Ne laser or an Ar laser was employed. The determination of the incidence angle of the reconstructing beam was made by fixedly mounting the hologram plate on a large hologram holder and by rotating the hologram holder. An overall system employing these arrangements for reconstructing holograms is of a fairly large scale, and so that even though the hologram itself may be made small, the overall system cannot be made compact to take advantage of the smallness of the hologram. Moreover, the angle of incidence of the reconstructing beam upon the hologram must be fairly accurate. However, this requirement leads to the following disadvantages as to the arrangement.

Figure 3:
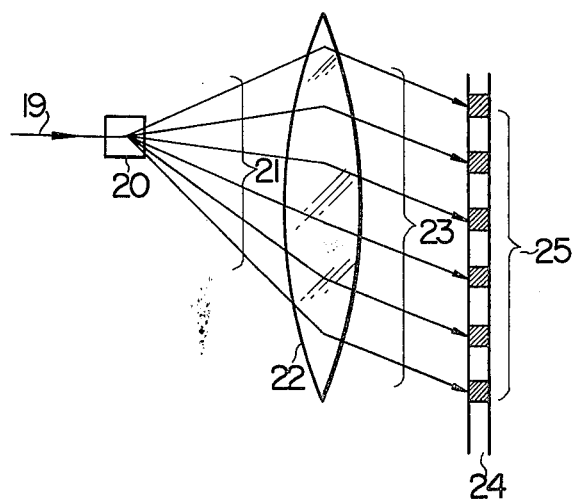
FIG. 3 is a diagram of explaining the reconstruction from a prior art array of a plurality of holograms.

As an example, consideration will be given to the case in which a plurality of holograms are arranged on a light sensitive medium as shown in FIG. 3. When information is to be reconstructed from each of holograms 25 on a light sensitive medium 24, it is necessary to form successively parallel light beams 23 to direct the laser beams 23 to the holograms 25 at the same incidence angle. To this end, it is common to form the parallel laser beams 23 by directing laser light 19 to a light deflector 20 to form deflected laser beams 21 which impinge upon a lens 22. As the light deflector 20 one which utilizes the electro-optical effect or the acoustico-optical effect is commonly employed. However, both of them are very expensive and troublesome to handle. Moreover, a precise adjustment thereof, when the parallel light beams 23 are to be formed by the lens 22, is very time-consuming. If the angles of the laser beams 23 incident upon the holograms 25 are not equal to each other, it is nearly impossible to successively reconstruct images from the holograms 25.

Furthermore, there is the disadvantage that since a single light source is used, the reconstructed images are all of the same wavelength, that is, the color images cannot be reconstructed by this system.

As another system in which an ordinary lamp, emitting white light, is employed as the light source in place of the laser source, there is a Lippmann type holograph. However, this system has the disadvantage that since only the light of the wavelength corresponding to the interval of the interference fringes is selected from the white light to be utilized, the output energy is very small relatively to the entire input energy, that is, the efficiency is very low.

The image reconstructed by the prior art reconstructing system is considerably dark. That is, the efficiency of reconstruction is about 10 to 20 % when the intensity of the reconstructing light source is constant. For example, when an He-He laser of a power of about 5 mW is used as the reconstructing light source, the reconstructed image necessarily becomes considerably dark.

SUMMARY OF THE INVENTION

An object of the present invention is to provide a small hologram device free from the restriction of the angle of a reconstructing beam incident thereupon.

Another object of the present invention is to provide a hologram device capable of reconstruction without utilizing an expensive light deflector.

A further object of the present invention is to provide a hologram device capable of providing a light holographic reconstructed image.

A still further object of the present invention is to provide a hologram device free from the necessity of accurate optical adjustment.

In order to achieve the above objects the present invention is characterized in that the part of a light sensitive medium at which a hologram is made is impregnated with a laser active material which functions as a light source or a light amplifier.

DESCRIPTION OF THE PREFERRED EMBODIMENTS

Figure 4:
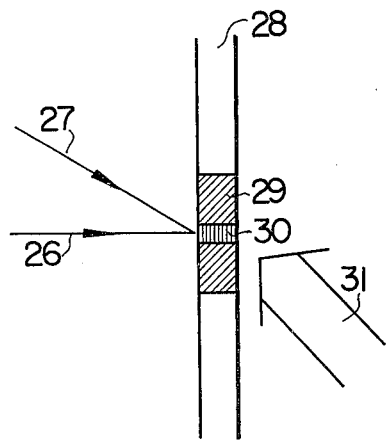
FIGS. 4, 5 and 6 are embodiments of the hologram device according to the present invention.

FIG. 4 shows an important part of an embodiment of the present invention. As the part of a light sensitive medium 28 at which the light sensitive medium 28 is impregnated with a laser active material 29 a hologram 30 is recorded by an information-carrying light beam 26 and a reference light beam 27 in a manner similar to the holographic recording shown in FIG. 1. In FIG. 4, an optical installation for the recording is omitted except the light sensitive medium 28 for the sake of simplicity.

All that has to be done to reconstruct an image from the thus made hologram 30 is to direct a reconstructing light beam to the hologram 30 in the same direction as that of the reference light beam 27 similarly to the hologram reconstruction shown in FIG. 2. However, in the present invention, when the reconstructing light beam is directed to the hologram 30, an exciting laser light beam is directed to the hologram 30 simultaneously with the reconstructing beam in an arbitrary direction. For example, an exciting laser beam 31 is directed to the hologram 30 in the direction as shown in FIG. 4, in which the exciting light source is omitted. By selecting a laser active material having an oscillation band equal to the wavelength of the reconstructing light as the laser active material 29, the energy of the laser exciting light is transformed by the laser active material 29 into the energy of the reconstructing light. This fact means that an amplification of the energy of the reconstructing light is effected in the bright sensitive medium. As a result, the reconstructed image becomes very light.

When an He-Ne laser (oscillation wavelength: 6328A), for example, is employed as the reconstructing light source, organic colorants such as rhodamine 6G or rhodamine B, for example, can be employed as the laser active material to be incorporated in the light sensitive medium. As the laser exciting light source for these colorants, an $N_2$ laser, the second harmonic of a YAG laser, the second harmonic of a ruby laser, or a xenon flash lamp may be employed.

Figure 5:
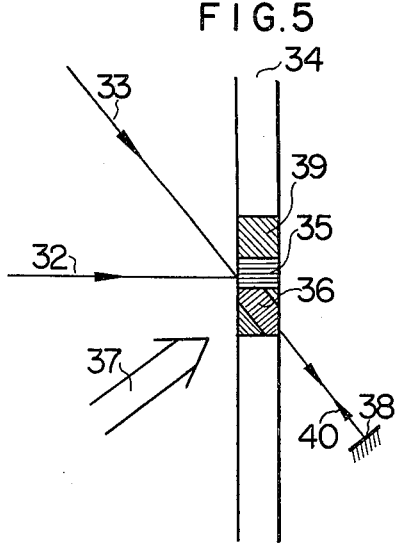

FIG. 5 shows an important part of another embodiment of the present invention, in which a hologram 35 is made by simultaneously directing an information-carrying object light beam 32 and a reference light beam 33 to the part of a light sensitive medium 34 at which the light sensitive medium 34 is impregnated with a laser active material 39 similarly to the embodiment of FIG. 4. However, in this embodiment, the reference light beam 33 passing through the light sensitive medium 34 is reflected by a reflector 38 disposed perpendicularly to the reference beam 33 so that the reflected light beam 40 reenters the light sensitive medium 34. Then, a resonator 36 consisting of a grating determined by the wavelength of the reference light beam 33 is formed in the hologram 35. The axial direction of the resonator 36 is the same as the direction of the reference beam.

To reconstruct an image from the thus made hologram it is unnecessary to direct a reconstructing light beam to the hologram at the same incidence angle as that of the reference light beam different from the prior art system. In other words, an exciting light beam 37 may be directed to the hologram at an arbitrary angle.

When the hologram is illuminated with the exciting light, the laser active material in the light sensitive medium is excited to oscillate in the axial direction of the resonator because this direction is the highest in the gain. Since the resonator is formed such that the axial direction thereof is in the incidence direction of the reference beam, the resonator functions as a laser source. By this interior laser source the image is reconstructed. Consequently, the hologram may be illuminated with the laser exciting light from any direction because the laser exciting light has only to excite the laser active material. Also, due to the fact that the laser light source exists in the light sensitive medium, no adjustment of the optical system is necessary, leading to a considerable compactness of the overall system. Moreover, even when images are to be reconstructed simultaneously or successively from an array of a plurality of holograms, an expensive light deflector is not necessary because it is only necessary to excite the holograms from an arbitrary direction. Furthermore, since the oscillation wavelength of the laser can be varied by varying the interval of the resonators, color images can be reconstructed by forming resonators at intervals corresponding to the wavelengths of red, green, blue, etc.

There are other methods of reconstructing color images. A first method is as follows. Color-information-carrying holograms are successively produced by the use of three color laser beams of red, green and blue at the same position of a light sensitive medium at which the light sensitive medium is impregnated with the light source as shown in FIG. 5. Then, a color image can be reconstructed from these holograms by directing exciting light to the holograms at an arbitrary angle because the inlaid light sources for respective colors are laser oscillated to reconstruct images for respective colors superimposedly on each other. A second method is as follows. Holograms impregnated with respective light sources are produced by laser light beams of red, green and blue at three different positions. The images reconstructed from the holograms are arranged such that they are formed at the same position. By directing white light or exciting laser light beams to the holograms simultaneously or successively at an arbitrary angle a color image can be reconstructed. When the holograms are illuminated successively, it is only sufficient to scan the exciting light by the use of, for example, a rotating mirror because the illuminating angle is arbitrary.

The laser active material can be excited by white light emitted by a xenon lamp, for example. By the arrangement of the present invention, considerably brighter monochromatic or color images can be reconstructed as compared with the prior art white light reconstructing Lippmann type hologram because the efficiency of energy conversion is very high for the laser oscillation.

The above description has been made of the case in which the light sensitiive medium is impregnated with a laser active material beforehand. However, the hologram may be impregnated with the laser active material after the hologram is recorded on the light sensitive medium. This is because the object of the present invention can be achieved as long as the light sensitive medium is impregnated with the laser active material. It is immaterial whether the light sensitive medium is impregnated with the laser active material before or after the recording of the hologram.

Figure 6:
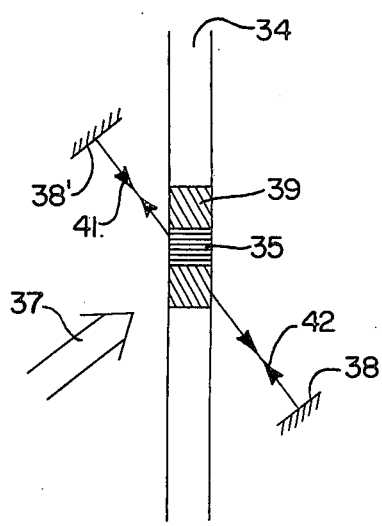

The embodiment of FIG. 5 is one in which a resonator is formed at the time of hologram recording. Since at least one resonator is sufficient for the purpose of the present invention, the resonator may be made outside the light sensitive medium. For example, at the time of reconstruction of an image from the hologram, a pair of parallel reflectors are formed perpendicularly to the direction of the reference light beam for recording the opposing relationship to each other with the laser active material interposed therebetween so that the light (fluorescent light) emitted by the laser active material when it is excited by laser exciting light undergoes multiple reflections. FIG. 6 depicts a schematic illustration of an embodiment of the invention wherein the resonator is formed external to the light sensitive medium. In FIG. 6 a reflecting mirror 38' cooperates with reflecting mirror 38 to form a resonator. Light beam 41 and light beam 42 are multiply reflected between the mirrors 38 and 38'. The remaining portion of FIG. 6 is designated by the same reference numerals shown in FIG. 5. Thus, a resonator structure is formed outside the light sensitive medium different from the embodiment of FIG. 5.

If a phase type light sensitive medium such as a dichromated gelatin plate is employed as the light sensitive material, the aforementioned interference fringes formed by the reference light and the reflected light are recorded as a distribution of refractive indices which form a plurality of resonator structures. The axial directions of the resonators are in agreement with the direction of the reference light. By suitably selecting the wavelength of the reference light the intervals of the interference fringes, i.e. resonators can be varied as desired, and hence the oscillation wavelength of the laser. An example of such construction is as follows:

| | |
|---|---|
| Light source for information-carrying light and reference light: | He-Ne laser (wavelength: 6328A) |
| Laser active material to be incorporated in light sensitive medium: | organic colorant "rhodamine 6G" |
| Light sensitive medium: | dichromated gelatin or polymethyl metaacrylate |
| Light source for internal resonator: | He-Cd laser (wavelength: 4420A) |
| Laser exciting light source: | N$_2$ laser (wavelength: 3371A) or xenon lamp |

We claim:

1. In a hologram recording apparatus, wherein an object beam spatially modulated with object information and a reference beam are directed upon a prescribed portion of a hologram recording medium to form a hologram of said information therein, said hologram being maintained within said hologram recording medium, the improvement wherein at least said prescribed portion of said hologram recording medium is impregnated with a laser active material which is different from the material of which said hologram recording medium is made.

2. The improvement according to claim 1, wherein said prescribed portion of said hologram recording medium includes means for forming an optical resonator structure, the axial direction of which coincides with the direction of impingement of said reference beam upon said hologram recording medium.

3. The improvement according to claim 2, further including reflecting means, disposed adjacent said hologram recording medium, perpendicularly with respect to the axial direction of said resonator structure, for causing light emitted from said hologram recording medium to reenter said medium along the axial direction of said resonator structure.

4. In a hologram recording and reconstructing apparatus, wherein an object beam spatially modulated with object information and a reference beam are directed upon a prescribed portion of a hologram recording medium to form a hologram of said information thereon, said hologram being maintained by said hologram recording medium, and wherein a reconstructing beam is directed onto said medium to reconstruct an image of said information from said hologram, the improvement wherein at least said prescribed portion of said hologram recording medium is impregnated with a laser active material which is different from the material of which said hologram recording medium is made and wherein said apparatus includes means for directing an exciting light beam upon said hologram recording medium, said exciting light beam being capable of exciting said laser active material.

5. In a hologram recording and reconstructing apparatus according to claim 4, wherein said reconstructing light beam has a wavelength lying in the oscillation band of said laser active material.

6. In a hologram recording and reconstructing apparatus wherein an object beam spatially modulated with object information and a reference beam are directed upon a prescribed portion of a hologram recording medium to form a hologram of said information thereon, said hologram being maintained by said hologram recording medium, and wherein a reconstructing beam is directed onto said medium to reconstruct an image of said information from said hologram, the improvement wherein at least said prescribed portion of said hologram recording medium is impregnated with a laser active material which is different from the material of which said hologram recording medium is made and has an optical resonator structure, the axial direction of which coincides with the direction of impingement of said reference beam upon said hologram recording medium, and further including means for directing an exciting beam as said reconstructing beam upon said hologram recording medium, for causing oscillation in said laser active material in the axial direction of said resonstor structure and thereby produce a reconstructed image of said information.

7. In a hologram recording and reconstructing apparatus according to claim 6, further including reflecting means, disposed adjacent said hologram recording medium perpendicularly with respect to the axial direction of said resonator structure, for causing light emitted from said hologram recording medium to reenter said medium along the axial direction of said resonator structure.

8. In a hologram recording and reconstructing apparatus according to claim 7, wherein said reflecting means comprises a pair of parallel reflectors disposed perpendicularly with respect to the axial direction of said resonator structure, with said laser active material interposed therebetween to form a resonator, so that light emitted by said laser active material, upon excitation by said exciting beam, undergoes multiple reflections through said laser active material between said parallel reflectors.

9. In a hologram recording and reproducing apparatus wherein an object beam spatially modulated with object information and a reference beam are directed upon a prescribed portion of a hologram recording medium to form a hologram of said information thereon, said hologram being maintained by said hologram recording medium, and wherein a reconstructing beam is directed onto said hologram recording medium to reconstruct an image of said information from said hologram, the improvement comprising laser active material, which is different from the material of which said hologram recording medium is made, impregnated in said halogram recording medium, for increasing the energy in the reconstructing beam emerging from said hologram recording medium, to thereby produce an amplified reconstructed image of said information.

10. The improvement according to claim 9, wherein at least said prescribed portion of said hologram recording medium contains said laser active material and further including means for directing an exciting beam upon said prescribed portion of said hologram recording medium to excite said laser active material upon which said reconstructing beam impinges, thereby amplifying the reconstructing beam emerging from said hologram recording medium.

11. In a method of recording a hologram, wherein an object beam spatially modulated with object information and a reference beam are directed upon a prescribed portion of a hologram recording medium to form a hologram of said information thereon, said hologram being maintained by said hologram recording medium, the improvement wherein the step of recording said hologram comprises disposing a hologram recording medium at least said prescribed portion of which is impregnated with laser active material, which is different from the material in which said hologram recording is made, in the path of said object and reference beams to thereby record a hologram within said laser active material.

12. In a method of recording a hologram and reconstructing an image therefrom, wherein an object beam spatially modulated with object information and a reference beam are directed upon a prescribed portion of a hologram recording medium to form a hologram of said information thereon, said hologram being maintained by said hologram recording medium, and a reconstructing beam is directed upon said hologram for reconstructing an image of said information, the improvement wherein the step of recording said hologram comprises disposing a hologram recording medium at least said prescribed portion of which is impregnated with a laser active material, which is different from the material of which said hologram recording medium is made, in the path of said object and reference beams to thereby record a hologram within said laser active material, and the step of reconstructing said image includes the step of directing an exciting beam upon said prescribed portion of said hologram recording medium to excite said laser active material upon which said reconstructing beam impinges, thereby providing an amplified beam containing the reconstructed image emerging from said hologram recording medium.

13. The improvement according to claim 12, wherein the step of reconstructing said image includes the step of directing a reconstructing beam upon said hologram recording medium in the same direction as said reference beam simultaneously with the step of directing said exciting beam upon said hologram recording medium.

14. The improvement according to claim 12, wherein said step of recording said hologram includes the step of forming resonator structure including said laser active material in said hologram recording medium so as to have an axial direction in alignment with the direction of said reference beam, and wherein the step of reconstructing said image comprises the step of directing said exciting beam as said reconstructing beam at upon said hologram recording medium, thereby exciting the laser active material of said resonator structure.

15. The improvement according to claim 14, wherein said step of forming a resonator structure comprises the steps of disposing reflecting means adjacent said hologram recording medium perpendicularly with respect to the direction of said reference beam, thereby causing light passing through the laser sensitive material to be reflected from said reflecting means and reenter said laser active material.

16. The improvement according to claim 14, wherein said step of forming a resonator structure includes the step of forming a plurality of resonators having different resonant wavelengths at varying intervals within said laser active material, to enable the reconstruction of color images therefrom.

17. The improvement according to claim 16, wherein said exciting beam is white light.

18. The improvement according to claim 14, wherein the step of forming resonator structure includes the step of successively forming a plurality of respective hologram resonators at the same position of said laser active medium by recording respectively different color holograms using different color recording beams, so that upon reconstruction a color image will be reconstructed.

19. The improvement according to claim 12, wherein said step of recording said hologram comprises the step of
impregnating at least the prescribed portion of a hologram recording medium where a hologram is to be formed with laser active material, and then
disposing the impregnated hologram recording medium in the path of said object and reference beams to record a hologram of said information in said laser active material.

20. The improvement according to claim 12, wherein the step of reconstructing an image of said information comprises the step of disposing a pair of parallel reflectors on opposite sides of said hologram recording medium containing said laser active material in a direction perpendicular to the direction of said reference beam during the recording step, so as to form resonator structure, for providing said amplified beam containing the reconstructed image upon excitation by said exciting beam.

21. In a method of recording a hologram and reconstructing an image therefrom, wherein an object beam spatially modulated with object information and a reference beam are directed upon a prescribed portion of a hologram recording medium to form a hologram of said information thereon, said hologram being maintained by said hologram recording medium, and a reconstructing beam is directed upon said hologram for reconstructing an image of said information, the improvement wherein the step of recording said hologram comprises disposing a hologram recording medium in the path of said object and reference beams to record a hologram of said information in said prescribed portion of said hologram recording medium and then impregnating at least said prescribed portion of said hologram recording medium with laser active material, which is different from the material of which said hologram recording medium is made, and the step of reconstructing said image includes the step of directing an exciting beam upon said prescribed portion of said hologram recording medium to excite said laser active material upon which said reconstructing beam impinges, thereby providing an amplified beam containing the reconstructed image emerging from said hologram recording medium.

* * * * *